United States Patent [19]

Imagawa et al.

[11] Patent Number: 5,716,217

[45] Date of Patent: *Feb. 10, 1998

[54] WATER BASE INK COMPOSITIONS FOR NEON BOARDS

[75] Inventors: Kiyotaka Imagawa; Yasuji Okuda, both of Osaka, Japan

[73] Assignee: Sakura Color Products Corp., Osaka, Japan

[*] Notice: The term of this patent shall not extend beyond the expiration date of Pat. No. 4,954,174.

[21] Appl. No.: 450,385

[22] Filed: May 25, 1995

Related U.S. Application Data

[62] Division of Ser. No. 106,526, Aug. 16, 1993, abandoned, which is a continuation of Ser. No. 822,603, Jan. 17, 1992, abandoned, which is a continuation of Ser. No. 434,958, Nov. 9, 1989, abandoned.

[51] Int. Cl.$^6$ .................... B43L 1/00; C09D 11/10
[52] U.S. Cl. .................... 434/408; 523/160; 523/161; 523/218; 260/DIG. 38; 524/315; 524/321; 524/389; 524/475; 524/563; 524/564
[58] Field of Search .................... 523/218, 160, 523/161; 260/DIG. 38; 106/19 R, 20 R, 32.5; 524/315, 321, 389, 475, 563, 564; 434/408

[56] References Cited

U.S. PATENT DOCUMENTS

| 4,954,174 | 9/1990 | Imagawa | 106/27 |
| 5,004,763 | 4/1991 | Imagawa | 523/161 |

*Primary Examiner*—Vasu Jagannathan
*Assistant Examiner*—John J. Guarnello
*Attorney, Agent, or Firm*—Howard C. Miskin

[57] ABSTRACT

A water base ink composition for writing on neon boards which comprises:

(a) water in amounts of not less than 30% by weight;
(b) hollow resin particles dispersed in the water, in amounts of 0.5–50% by weight;
(c) a resin which is film-forming at room temperatures in amounts of 0.5–30% by weight; and
(d) an aqueous emulsion of at least one nonvolatile or only slightly volatile compound which is liquid at room temperatures and is selected from the group consisting of aliphatic carboxylic acid esters, higher hydrocarbons and higher alcohols in dry amounts of 0.5–25% by weight.

Writings or marking formed with the ink composition on transparent panels such as of polymethyl methacrylate are intensely and vividly brightened when the side face receives light incident perpendicularly into the panel, as the panels are called "neon boards".

13 Claims, No Drawings

WATER BASE INK COMPOSITIONS FOR NEON BOARDS

This is a divisional of application Ser. No. 08/106,526, filed Aug. 16, 1993, which is a continuation of Ser. No. 07/822,603, filed Jan. 17, 1992, now abandoned, which was a continuation of Ser. No. 07/434,958 filed Nov. 9, 1989, now abandoned.

This invention relates to a water base ink composition which forms erasable and light-scattering writings or markings on impervious surfaces of transparent panels or "neon boards" such as of resins or glass. The invention further relates to a neon board having writings thereon formed with such an ink composition, a method of preparing a neon board using such an ink composition, and a marking pen suitably used for writing to prepare neon boards.

Display means are already known which are composed of transparent panels such as of resins or glass having on either surfaces thereof markings or writings and light sources placed at one of the side faces. When the side face receives light incident perpendicularly into the panel, the light travels towards the other side face between the surfaces of the panels and scatters outwards at the writings to brighten them as if the writings emitted light. These display means may be associated with neon signs and will be called herein "neon boards". The transparent panels are composed preferably of highly refractive materials, and most preferably of polymethyl methacrylate.

Heretofore, there have been used ordinary nonerasable water base ink compositions to form writings on the panels. Solvent base erasable ink compositions for use in marking pens have also been used which contain chromatic pigments and white pigments dispersed in orgasmic solvents such as ketones or alcohols.

However, these ink compositions are not specifically designed to be suitably applied to neon boards. Thus, the prior ink compositions are insufficient in light scatttering properties and are rather poorly brightened. As a further defect, the prior solvent base erasable ink compositions for use in marking pens usually employ titanium dioxide as white pigments. Titanium dioxide is superior in hiding power, but since it has a large specific gravity and a large particle size, and hence it is poorly dispersible in ink compositions. Therefore, titanium dioxide can not be used in marking pens which contain an absorbent ink reservoir and a pen tip connected thereto, since titanium dioxide deposits in the ink reservoirs.

Such marking pens are well known in the art. For instance, the absorbent ink reservoir is a microporous absorbent body composed of fibrous or felt-like material or any other suitable absorbent material and likewise a microporous a pen tip connected thereto to which inks are supplied by the ink reservoir through capillarity of the microporous networks. Pen tips are also known which are composed of molded resins, as they are called plastic pens.

White pigments of smaller mallet particle size may be superior in dispersibility in ink compositions, but the compositions are poorly light-scattering so that they are not suitably used for preparing neon boards.

As a still defect, ketones are very toxic among organic soft vents used in prior solvent base erasable ink compositions for marking pens. Methanol is also toxic among alcohols, and smells bad. Ethanol is less toxic, but is expensive.

On the other hand, a water base erasble ink composition is also known which contains a resin emulsion such as a polyvinyl acetate emulsion as a separating agent together with a dyestuff or a pigment as a coloring agent, and a surfactant. However, when writings are formed with such an ink composition on an impervious surface and dried, the resin emulsion forms a continuous adhesive film on the impervious surface, as is the case with a known so-called strippable paint. Consequently the writing is not so easily separated or erased from the surface by light wiping with, for example, soft cloth or tissue paper. Moreover, when the writing is rather strongly wiped, it is separated as a continuous film from the surface. Namely, even when the writing is wiped only at a part thereof, it often happens that the entire writing is separated from the writing surface. Moreover, it is fatal that the, writings formed therewith on the panels are poorly brightened.

It is an object of the invention to provide an ink composition suitably used for providing writings on neon boards which is not only intensely and vividly brightened but also readily erased at wiped portions from the neon boards, and further, which is suitable for use in marking pens which employ an absorbent ink reservoir and a pen tip connected thereto.

It is further objects of the invention to provide a method of preparing a neon board and the thus prepared neon boards.

It is still an object of the invention to provide a marking pen suitably used for writing on a panel to prepare a neon board.

There is provided in accordance with the invention a water base ink composition for writing on neon boards which comprises:

(a) water in amounts of not less than 30% by weight;
(b) hollow resin particles dispersed in the water in amounts of 0.5–50% by weight;
(c) a resin which is water soluble and film-forming at room temperatures in amounts of 0.5–30% by weight; and
(d) an aqueous emulsion of at least one nonvolatile or only slightly volatile compound which is liquid at room temperatures and is selected from the group consisting of aliphatic carboxylic acid esters, higher hydrocarbons and higher alcohols in dry amounts of 0.5–25% by weight.

The ink composition of the invention contains water as solvents in amounts of not less than 30% by weight, preferably in amounts of not less than 50% by weight, based on the ink composition. When the amount of water is less than 30% by weight, the resultant ink compositions are so viscous that they write bad.

The ink composition contains therein hollow resin particles in the form of aqueous emulsions to increase light-scattering properties of writings formed on neon boards. The hollow resin particles are already known as plastic pigments and are used as white pigments in water base ink compositions, as described in Japanese Patent Laid-open No. 63-145382 and No. 63-145383.

The hollow resin particles are usually obtained by emulsion (co)polymerization of one or more of styrene, acrylic acid, acrylic ester, methyl methacrylate or vinyl chloride. Thus, the hollow resin particles are available as aqueous emulsions of (co)polymers such as polystyrenes, acrylic/styrene copolymers, polymethyl methacrylates or polyvinyl chlorides. The hollow resin particles usually have a specific: gravity of not more than one, a particle size of about 0.1–1.0 μm and a refractive index of 1.4–1.6. Aqueous emulsions of such hollow resin particles are available, for example, as Voncoat or Grandol, both being acrylic/styrene copolymers, by Dainippon Ink Kagaku Kogyo K. K., Opaque Polymer (acrylic/styrene copolymers) by Rohm & Haas Japan K. K., or Latex SBL 8801 (polystyrene) by Asahi Kasei Kogyo K. K.

The hollow resin particles are contained in solid amounts of not less than 0.5% by weight, preferably of not less than 10% by weight, based on the ink composition. When the amount of the hollow resin particles is less than 0.5% by weight based on the ink composition, the resulting ink compositions are insufficient in light-scattering properties, so that writings on neon boards are not intensely brightened. On the other hand, it is desired that the hollow resin particles are contained in amounts of not more than 50% weight, preferably of not more than 40% by weight, based on the ink composition, from the standpoint of stability and adhesion of ink compositions onto neon boards.

Further, it is desired that the hollow resin particles used in the invention have a particle size of 0.2–0.6 μm from the standpoint of light-scarrering power and stability of dispersion in ink compositions.

The hollow resin particles act both as light-scattering agents and white colorants. Thus, the use of the hollow resin particles only as colorants provides white ink compositions. Achromatic other than white, or chromatic ink compositions are obtained by employing, as colorants, dyes which are preferably water soluble, or pigments which have a particle size preferably of 0.01–1 μm. Water insoluble dyes may also be used as a coloring agent, if necessary. The water insoluble dyes used preferably have a particle size of 0.01–0.7 μm, and the dyes are dispersed in water using a suitable dispersant.

As coloring agents, any pigment may be used, and the pigments usable include, for example, carbon black, phthalocyanines such as copper phthalocyanine blue, azo pigments, quinaeridones, anthraquinones, dioxazines, indigos, thioindigos, perynones, perylenes, indolenones and azo-azomethines.

A variety of aqueous pigment dispersions are commercially available, and they may be preferably used in the invention. The dispersion usually contains a dispersant and/ or a surfactant, so that the ink composition of the invention may contain such a dispersant and/or a surfactant when the dispersion is used in the ink composition. The dispersant is usually of organic polymers and is contained in the dispersion usually in amounts of 1–300 parts by weight, preferably in amounts of 5–100 parts by weight, per one part by weight of pigments.

In place of pigments or dyes, hollow resin particles colored with dyes to produce chromatic ink compositions of the invention.

The content of coloring agents in the ink composition is usually not more than 20% by weight, preferably not more than 10% by weight. When the content of coloring agents is too large, the resultant ink compositions have an excessively high viscosity so that they write bad, but also they are reduced in erasability, and further, writings formed therewith are not intensely brightened.

The ink composition of the invention contains a resin which is water soluble and film-forming at room temperatures to improve leveling properties of writings on neon boards and dipersibility of coloring agents used in the ink compositions.

As such water soluble and film-forming resins, there are used either resins which are water soluble by nature, aqueous emulsions or hydrosols of water insoluble resins, or water-solubilized resins. The water-solubilized resins are herein the specification defined as resins which are by nature water insoluble, but are made water-soluble by salt formation with inorganic or organic bases, such as alkali metal salts, e.g., sodium or potassium salts, ammonium salts or amine salts.

There may be mentioned as resins which are water soluble by nature, for example, synthetic resins such as polyvinyl pyrrolidone or polyvinyl alcohol, or natural resins such as shellac or gum arabic.

The emulsions or hydrosols of by nature water insoluble resins usable include, for example, those of polyvinyl acetates, vinyl acetate copolymers, styrene-maleic anhydride resins, alkyd resins or urethane resins. The water-solublized resins usable include, for example, water-solublized polyvinyl acetates, vinyl acetate copolymers, alkyd resins and urethane resins.

The vinyl acetate copolymers mentioned above include copolymers of vinyl acetate with unsaturated carboxylic acids such as acrylic acid, methacrylic acid, maleic acid, maleic anhydride, fumaric acid, itaconic acid, crotonic acid or citraconic acid, vinyl esters other than vinyl acetate, such as vinyl propionate, vinyl hydrocarbons such as ethylene, propylene, butene, styrene, α-methylstyrene, acrylic or methacrylic acid esters such as methyl acrylate, ethyl acrylate, butyl acrylate, methyl methacrylate, ethyl methacrylate or dimethyl maleate. The vinyl acetate copolymer may be a graft one with the monomers as above described onto polyvinyl acetates.

Preferred vinyl acetate copolymers may be exemplified by vinyl acetate-acrylic acid copolymer, vinyl acetate-methacrylic acid copolymer, vinyl acetate-styrene-acrylic acid copolymer, vinyl acetate-styrene-maleic anhydide copolymer, vinyl acetate-acrylic acid-methyl acrylate copolymer, vinyl acetate-methacrylic acid-methyl acrylate copolymer, vinyl acetate-acrylic acid-ethyl acrylate copolymer, vinyl acetate-methacrylic acid-methyl methacrylate copolymer and vinyl acetate-maleic anhydide copolymer. The vinyl acetate coplymers are usually water insoluble, however, the inorganic or organic salts thereof are water soluble. Theses water-solublized copolymers are commercially available.

Similarly, the water-solublized alkyd resins may be prepared by condensation of excessive unsaturated carboxylic acids with polyhydric alcohols, and salt formation with alkali metal bases, ammonium bases or organic amines. The water-solubilized urethane resins may be prepared by salt-formation of pendant carboxylic groups in the polymer chain with alkali metal bases, ammonium bases or organic amines. These water-solubilzed alkyd resins and urethane resins are also commercially available.

The water soluble or water-solubilized resin is contained in the ink composition in amounts of 0.5–30% by weight, preferably in amounts of 1–20% by weight, based on the ink composition. When the amount of the resin is too large, the resultant ink composition has an excessively high viscosity so that it writes bad but also writings formed therewith is not readily erased.

The ink composition of the invention contains water soluble resins, water solubilzed resins or emulsions or hydrosols of water insoluble resins as above described. As results, when writings are formed on neon boards with the ink composition, the resin forms a film which contains the hollow resin particles and colorants therein. Namely, the resin acts as a carrier of the hollow resin particles and colorants. Therefore, the use of emulsions of by nature water insoluble resin or resins which are by nature water insoluble but are made water soluble by salt formation is in particular preferred in the invention, since ink compositions containing such resins provide writings which are not only water resistant but also erasable irrespectively of ambient conditions of temperature and humidity.

The ink composition of the invention contains a separating agent which is an aqueous emulsion of at least one nonvolatile or only slightly volatile compound which is liquid at room temperatures and is selected from the group consiting of aliphatic carboxylic acid esters, higher hydrocarbons and higher alcohols.

The aliphatic carboxylic acid ester includes mono-basic carboxylic acid esters, dibasic carboxylic acid diesters, mono- or diesters of dihydric alcohols, and mono-, di- or triesters of trihydric alcohols. More specifically, there may be used monobasic carboxylic acid esters, preferably higher fatty acid esters such as ethyl oleate, butyl laurate, hexyl laurate, isostearyl laurate, oleyl 2-ethylhexanoate, ethyl isostearate, butyl stearate, isopropyl myristate, butyl palmitate, isooctyl palmitate, isooctadecyl palmitate, isooctyl stearate and isooctadecyl stearate; dibasic acid diesters such as dodecanedioic acid dioctyl ester, dipropyl adipate, dioctyl sebacate or dioctyl azelate; dihydric alcohol esters such as propylene glycol monostearate or propyleneglycol didecanoate; and trihydric alcohol esters such as natural or synthetic fatty acid triglycerides, for example, caproic acid triglyceride, carprylic acid triglyceride, lauric acid triglyceride, 2-hexyldecanoic acid triglyceride or the like. The triglyceride may be a mixed triglyceride in which the fatty acid components are different from each other. Further, the triglyceride may be used singly or as a mixture. Fatty acid trimethylolpropane triesters such as triisostearate may also be used.

The higher hydrocarbon used as a separating agent is not specifically limited, but may be exemplified by liquid paraffin and squalane. Oxydized polyethylene wax may also be used. The higher alcohol used is also not specifically limited, but may be exemplified by hexyl alcohol, octyl alcohol and lauryl alcohol.

Aqueous emulsions of the aliphatic carboxylic acid esters, higher hydrocarbons or higher alcohols may be prepared by conventional emulsifying methods, and are commercially available. The emulsion may be used singly or as a mixture of two or more.

The emulsion is contained in the ink composition of the invention so that the aliphatic carboxylic acid ester, higher hydrocarbon, higher alcohol or a mixture of two or more of these is contained in dry amounts of 0.5–25% by weight, preferably in amounts of 5–15% by weight, based on the ink composition. When the amount of the liquid compound, i.e., the ester, hydrocarbon or alcohol, is less than 0.5% by weight based on the ink composition, the resultant ink composition is not readily erasable or seaparable from a panel, whereas when the amount of the liquid compound is more than 25% by weight, the resultant ink composition stains a panel when being wiped. Further, writings formed therewith are not readily erased.

The ink composition of the invention may contain a water soluble polyhydric alcohol to assist the separation of writings from writing surfaces. The polyhydric alcohol usable includes, for example, ethylene glycol, diethylene glycol, triethylene glycol, propylene glycol, dipropylene glycol, tripropylene glycol, polyethylene glycol having a molecular weight of about 200–600, polypropylene glycol having a molecular weight of about 1000–3000, glycerine and trimethylolpropane. The polyhydric alcohol may be contained in amounts of not more than 20% by weight, preferably in amounts of not more than 10% by weight, based on the ink composition. When the amount of the polyhydric alcohol is too large, the resultant ink composition has an excessively large viscosity and writes bad.

A variety of surfactants, either anionic, nonionic, cationic or ampholytic, may also be incorporated in the ink composition as a writing separation assintant. Among the surfactants are preferred polyoxyethylene carboxylic acid, sulfonic acid, sulfate or phosphate nonsense or anionic surfactants, ampholytic betaine surfactants or fluorinated surfactants. The amount of surfactants may be not more than 10% by weight, preferably in the range of 0.2–5% by weight based on the ink composition. The use of exessive amount deteriolates erasability of the ink composition.

Although the invention is not limited by any theory, however, when writings are formed on an impervious writing surface with a marking pen, and when the water has been evaporated or the writing has been dried, the resin forms a film which contains the hollow resin particles and the pigment, while the emulsion of the separating agent is broken to form a continuous oily layer between the writing surface and the resin film, and therefore the writing is separable or erasable from the surface by being wiped.

The surfactant assists the separation of the oily layer from the resin layer when writings are formed. Moreover, the surfactant provides a leveling effect with writings formed but also prevents the emulsion from being unevenly distributed on a writing surface when, writings are formed, so that the dried writing is evenly erasable. From these standpoints, fluorinated surfactants are most preferred.

Lower aliphatic alcohols may be contained in the ink composition so that writings are readily dried when formed. However, the alcohol must not break the emulsion in the ink composition, and therefore the amount may be not more than 15% by weight, preferably in the range of 1–10% by weight, based on the ink composition. The preferred alcohol may be ethanol, propanol or butanol.

The ink composition may further contain any conventional additives used in water base ink compositions, such as pH controllers, anticorrosion agents or dispersion assistants in effective amounts.

As above set forth, the water base ink composition of the invention contains hollow resin particles which are of a much smaller specific gravity and particle size than titanium dioxide, and are still superior in light-scattering properties.

Thus, in accordance with the invention, there is provided a method of preparing a neon board which comprises forming writings on at least one of flat surfaces of a transparent panel with the ink composition of the invention as described hereinbefore. The writings thus formed on the panel are clearly visible in the dark when light is applied into the panel.

There is further provided a neon board in accordance with the invention which comprises a transparent panel having flat surfaces, a light source placed at one of the side faces thereof and writings formed with the ink composition of the invention on at least one of the surfaces of the panel.

Further, since the hollow resin particles are excellent in dispersibility in the ink composition, contrary to titanium dioxide, there takes place no deposition or coagulation of the particles even after a long period of standing of the ink composition. Thus, in accordance with the invention, there is provided a marking pen which employs an absorbent ink reservoir impregnated with such an ink composition as described hereinbefore and a pen tip connected thereto, for use in writing on a transparent panel and thus suitably used for preparing a neon board.

As a further feature, the ink composition of the invention is very little toxic, and is attended by very little bad and irritant smell since it is water base. Further, the ink composition of the invention contains a water soluble and film forming resins together with a separating agent. The separating agent forms a continuous oily layer on the surface to separate the layer of the resin which contains the hollow resin particles therein from the writing surface, so that the writing is as readily separated from the writing surface as the conventional solvent base erasable ink compositions.

In particular, the separating layer is not a solid film, but an oily one, so that when the writing is wiped only partly, the wiped portions only are erased. Further, since the separating layer is composed of nonvolatile or only slightly volatile liquid compound, writings are readily erasable after long standing.

When the ink composition contains a by nature water insoluble resin in a water-solubilized form, or more preferably as a hydrosol or an emulsion, the resin forms a layer which is highly water resistant as well as readily and stably erasable irrespectively of ambient humidity conditions.

The invention will now be described with reference to examples, however, which are not to be construed as limiting to the invention. In the examples, percentages are % by weght.

EXAMPLES

The following ink compositions were prepared which had the compositions below. The percentages designate effective (dry or solid) amounts of ingredients and the balance is water and effective amounts of anticorrosion agents.

| | |
|---|---|
| Coloring agent: Carbon black | 6% |
| Dispersant: Nikkol PLP-10[1] | 2% |
| Hollow resin particles: Ropawue OP-84J[2] | 20% |
| Resins: Mowinyl Powder SA[3] | 7% |
| Separating agent: Emulsion of butyl stearate | 10% |
| Surfactant: Nopco Wet 50[4] | 0.5% |

| | |
|---|---|
| Coloring agent: Phthalocyanine Blue | 6% |
| Dispersant: Joncryl J-682[5] | 2% |
| Hollow resin particles: Grandol PP-1100[6] | 25% |
| Resins: Polysol HR-8E[7] | 5.5% |
| Separating agent: Emulsion of butyl palmitate | 10% |
| Separating assistant: Polypropylene glycol (average molecular weight of 600) | 3% |
| Surfactant: | |
| Noigen ET-135[8] | 2% |
| Unidyne DS-401[9] | 1.5% |

| | |
|---|---|
| Coloring agent: Monoazo Yellow | 5% |
| Dispersant: Hiros AW-36[10] | 1.5% |
| Hollow resin particles: Grandol PP-1000[11] | 25% |
| Resins: Polyvinyl alcohol 204[12] | 6.5% |
| Separating agent: | |
| Emulsion of squalane | 6% |
| Emulsion of dioctyl azelate | 5% |
| Surfactant: Neocol SW[13] | 0.5% |

| | |
|---|---|
| Coloring agent: None | |
| Dispersant: None | |
| Hollow resin particles: Latex SBL 8801[14] | 35% |
| Resins: Nikasol CL-204[15] | 6% |
| Separating agent: | |
| Isopropyl myristate | 8% |
| Toray Silicone SF 8427[16] | 2% |
| Surfactant: Fluorad F-430[17] | 1% |

| | |
|---|---|
| Coloring agent: NLA-655 Scarlet[18] | 15% |
| Dispersant: None | 1.5% |
| Hollow resin particles: Grandol PP-1001[19] | 30% |
| Resins: UMR Resin 10HH[20] | 6% |
| Separating agent: Emulsion of octyl stearate | 5% |
| Separating assistant: Polypropylene glycol (average molecular weight of 1000) | 3% |
| Surfactant: Anhitol 24B[21] | 3% |

| | |
|---|---|
| Coloring agent: Blue No. 1 | 4% |
| Dispersant: None | 1.5% |
| Hollow resin particles: Grandol PP-1000 | 35% |
| Resins: Mowinyl DM1H[22] | 5% |
| Separating agent: Liquid paraffin 150-S emulsion | 8% |
| Surfactant: Neokol SW | 1% |

| | |
|---|---|
| Coloring agent: Phthalocyanine Blue | 5% |
| Dispersant: Nikkol DLP-10 | 2% |
| Hollow resin particles: Grandol PP-1100 | 20% |
| Resins: Mowinyl Powder SA | 7% |
| Separating agent: None | |
| Surfactant: Nopco Wet 50 | 0.5% |

| | |
|---|---|
| Coloring agent: Phthalocyanine Blue | 5% |
| Dispersant: Nikkol DLP-10 | 2% |
| Hollow resin particles: Mowinyl 972[23] | 20% |
| Resins: Mowinyl Powder SA | 7% |
| Separating agent: Emulsion of butyl stearate | 10% |
| Surfactant: Nopco Wet 50 | 0.5% |

| | |
|---|---|
| Coloring agent: Phthalocyanine Blue | 5% |
| Dispersant: Nikkol DLP-10 | 2% |
| Hollow resin particles: Mowinyl 972 | 20% |
| Resins: Mowinyl Powder SA | 7% |
| Separating agent: None | |
| Surfactant: Nopco Wet 50 | 0.5% |

Notes

1) Nonionic surfactant, Nihon Surfactant Kogyo K. K.
2) Hollow resin particles of acrylic/styrene copolymers, Rohm & Haas Japan.
3) Vinyl acetate/acrylic copolymers, Hoechst Gosei K. K.
4) Aninoic surfactant, San Nopco Ltd.
5) Acrylic/styrene copolymers, Johnson Polymer K. K.
6) Hollow resin particles of acrylic/styrene copolymers, Dainippon Ink Kagaku Kogyo K. K.
7) Emulsion of vinyl acetate/acrylic copolymers, Showa Kobunshi K. K.
8) Nonionic surfactant, Daiichi Kogyo Seiyaku K. K.
9) Fluorinated surfactant, Daikin Kogyo K. K.
10) Acrylic resins, Seiko Kagaku K. K.
11) Hollow resin particles of acrylic/styrene copolymers, Dainippon Ink Kagaku Kogyo K. K.
12) Polyvinyl alcohol, Kuraray K. K.
13) Nonionic surfactant, Daiichi Kogyo Seiyaku K. K.
14) Hollow resin particles of polystyrene, Asahi Kasei Kogyo K. K.
15) Vinyl acetate/acrylic copolymers, Nihon Carbide K. K.

16) Alcohol-modified silicone, Toray K. K.
17) Fluorinated surfactant, Sumitomo 3M K. K.
18) Pigment dispersion
19) Hollow resin particles of acrylic/styrene copolymers, Dainippon Ink Kagaku Kogyo K. K.
20) Saponified polyvinyl acetate, Unitika Kasei K. K.
21) Ampholytic surfactant, Kao K. K.
22) Vinyl acetate/maleate copolymers, Hoechst Gosei K. K.
23) Emulsion of soild resin particles, Hoechst Gosei K. K.

Writings of about 2×2 cm were provided on writing boards of transparent polymethyl metacrylate using the above ink compositions. The boards were placed in the dark, and light was applied from one of the side facese perpendicularly into the panels, and the panels were tested whether the writings were clearly visible in the dark from a place five meters apart therefrom (visibility).

Further writings were provided on writing boards of transparent polymethyl metacrylate using the above ink compositions, left standing, and then wiped lightly with dry cloth, to evaluate erasability of the writings after five minutes (initial erasability) and after one week (standing erasability), at temperatures of 25° C. under a relative humidity of 60%. The erasability was evaluated with the eyes: A, readily erasable; B, fairly erasable; C, only slightly erasable; and D, not erasable. The results are shown in the Table 1.

For comparison, the same erasability tests were carried out with conventional solvent base erasable ink compositions containing ketones and alcohols as solvents, respectively, and titanium dioxide as colorants. The results are shown in Table 1.

TABLE 1

| Ink Compositions | Visibility | Erasability Initial | Erasability Standing |
|---|---|---|---|
| Conventional 1[1] | A | C | D |
| 2[2] | A | C | D |
| 1 | A | A | A |
| 2 | A | A | A |
| 3 | A | A | A |
| 4 | A | A | B |
| 5 | A | A | A |
| 6 | A | A | B |
| 7[3] | A | C | D |
| 8[3] | D | A | A |
| 9[3] | D | C | D |

Notes: [1] Contains ketones as a solvent.
[2] Contains alcohols as a solvent.
[3] Comparative examples The water base ink composition of the invention contains no titanium dioxide, but is comparable with the solvent base compositions in the visibility in the dark. Further, the ink composition of the invention retains erasability comarable to the conventional water base erasable ink compositions.

What is claimed is:

1. A NEON board comprising a transparent panel of polymethyl methacrylate which has impervious surfaces and a water base ink composition forming erasable and light-scattering writings on said surfaces, said ink composition comprising:

(a) water in an amount of not less than 50% by weight;
   (b) hollow resin particles providing a light scattering agent and a colorant in the form of an aqueous emulsion which have a particle size of 0.1–1.0 microns and a refractive index of 1.4–1.6 dispersed in the water in an amount of 0.5–50% by weight;
   (c) a resin which is water soluble and film-forming at room temperatures in an amount of 0.5–30% by weight; and
   (d) an aqueous emulsion of a nonvolatile aliphatic carboxylic acid ester in a dry amount of 0.5–25% by weight.

2. The NEON board as claimed in claim 1 wherein the water soluble resin is polyvinyl alcohol.

3. The NEON board as claimed in claim 1 wherein the ink composition further contains a water soluble polyhydric alcohol in an amount of not more than 20% by weight based on the ink composition.

4. The NEON board as claimed in claim 1 wherein the ink composition further contains a lower aliphatic alcohol in an amount of not more than 15% by weight based on the ink composition.

5. The NEON board as claimed in claim 1 wherein the aliphatic carboxylic acid ester is a monobasic carboxylic acid ester, a dibasic carboxylic acid diester, a mono- or diester of a dihydric alcohol, or a mono-, di- or triester of a trihydric alcohol.

6. The NEON board as claimed in claim 1 wherein the ink composition further contains surfactants.

7. The NEON board as claimed in claim 1 wherein the ink composition further includes a chromatic pigment or a dye as an additional colorant in an amount of not more than 20% by weight.

8. A method for preparing a neon board having a transparent panel of polymethyl methacrylate resin which has impervious surfaces with erasable and light-scattering writings thereon, which comprises forming the writings on the impervious surface with a marking pen which contains an absorbent ink reservoir therein impregnated with an ink composition and a pen tip connected thereto, the ink composition comprising:

(a) water in an amount of no less than 50% by weight;
   (b) hollow resin particles as a light scattering agent and a colorant in the form of aqueous emulsion which have a particle size of 0.1–1.0 microns and a refractive index of 1.4–1.6 dispersed in the water in an amount of 0.5–50% by weight;
   (c) a resin which is by nature water insoluble and film-forming at room temperatures, but is either made water soluble by salt formation with bases, or is in the form of aqueous emulsions or hydrosols in an amount of 0.5–30% by weight; wherein the resin is selected from the group consisting of polyvinyl acetate and vinyl acetate copolymers; and
   (d) an aqueous emulsion of a nonvolatile aliphatic carboxylic acid ester in a dry amount of 0.5–25% by weight.

9. The method as claimed in claim 8 wherein the ink composition further contains a water soluble polyhydric alcohol in an amount of not more than 20% by weight based on the ink composition.

10. The method as claimed in claim 8 wherein the ink composition further contains a lower aliphatic alcohol in an amount for not more that 15% by weight based on the ink composition.

11. The method as claimed in claim 8 wherein the aliphatic carboxylic acid ester is monobasic carboxylic acid ester, a dibasic carboxylic acid diester, a mono or diester of dihydric alcohol, or a mono-, di- or triester of a trihydric alcohol.

12. The method as claimed in claim 8 wherein the ink composition further contains surfactants.

13. The method as claimed in claim 8 wherein the ink composition further contains a chromatic pigment or a dye as an additional colorant in an amount of not more than 20% by weight.

* * * * *